J. F. TEELING.
FISHING LINE HOLDER.
APPLICATION FILED MAR. 7, 1917.
1,253,746.
Patented Jan. 15, 1918.
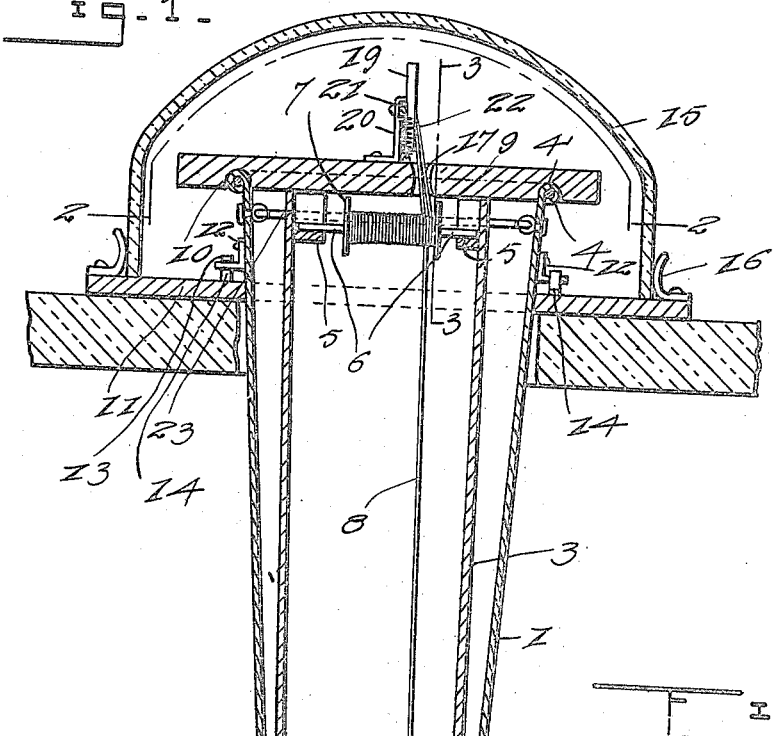
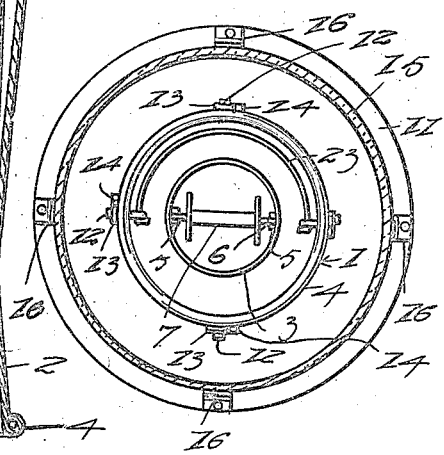
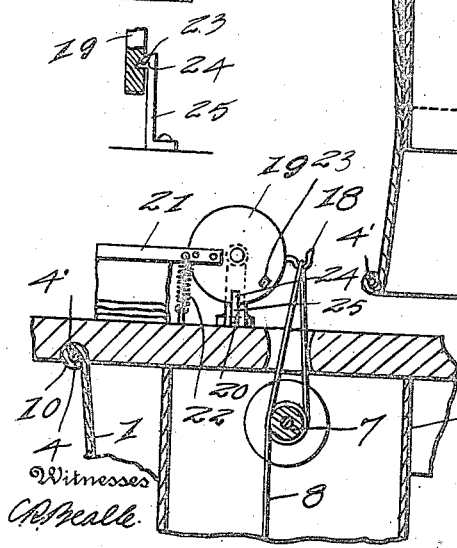
Inventor.
J. F. Teeling

UNITED STATES PATENT OFFICE.

JOHN F. TEELING, OF WAYVILLE, NEW YORK.

FISHING-LINE HOLDER.

1,253,746. Specification of Letters Patent. Patented Jan. 15, 1918.

Application filed March 7, 1917. Serial No. 153,181.

*To all whom it may concern:*

Be it known that I, JOHN F. TEELING, a citizen of the United States, residing at Wayville, in the county of Saratoga and State of New York, have invented certain new and useful Improvements in Fishing-Line Holders; and I do hereby declare the following to be a full, clear, and exact description of the invention, such as will enable others skilled in the art to which it appertains to make and use the same.

This invention relates to improvements in fishing line holders of that type including a hollow body designed to be positioned within an opening made in the ice of a frozen pond, river, or like body of water, and adapted to effectively support a fishing line which is extended therethrough; and an object of the invention is to improve the general construction of holder by compactly arranging the component parts including the same, and one which includes means adapted to be embedded in the ice after the holder has been placed within the opening to normally hold the body of the holder against upward and downward movement in the opening, and also one including a signaling device that has novel connection with the fishing line and normally lies in inoperative position and adapted to be moved to operative position upon a downward pull on the line caused by a fish being caught on the lower end thereof.

Other objects will appear and be better understood from that embodiment of my invention of which the following is a specification, reference being had to the accompanying drawing forming a part thereof, in which:

Figure 1 is a vertical sectional view taken through the holder,

Fig. 2 is a section taken on the line 2—2 of Fig. 1,

Fig. 3 is a section taken on the line 3—3 of Fig. 1,

Fig. 4 is an edge view of the wheel that carries the signal, and showing the manner of locking the wheel against rotation after it has been rotated to raise the signal to operative position.

Referring to the drawing in detail, the holder comprises a body having its opposite ends open, and consists of an outer inverted substantially frusto-conical shaped shell 1, to the lower end of which is secured, preferably by soldering the upper end of a frusto-conical shaped extension 2, and an inner shell 3, that is positioned within the outer shell 1 and has its lower end thereof projecting below the lower end of the outer shell 1, and into the extension 2, and secured therewithin in any suitable manner, and terminally located above the lower end of the extension 2, as shown more particularly in Fig. 1 of the drawing. The inner shell 3 gradually increases in diameter toward the upper end, and as shown in Fig. 1, is spaced, for the major portion of its length from the inner surface of the outer shell 1. The terminals of the upper end of the outer shell and the lower end of the extension 2 are rolled upon themselves to provide reinforcing beads 4, within which are arranged wire inserts 4'. The inner shell 3 is provided, adjacent its upper end, and at diametrically opposite points, with suitable bearings 5, in which are journaled the opposite ends of a shaft 6, which carries a reel 7, upon which is wound a fishing line 8. The body of the holder is adapted to be inserted through an opening made in the ice, as shown in Fig. 1 of the drawing, and when in operative position the free end of the fishing line 8 extends downwardly through the inner shell 3 and through the lower or flared end 2 of the outer shell 1. By virtue of the provision of the frusto-conical shaped extension 2, the line can have relatively wide lateral movement without coming in contact with the lower terminal of the flared end 2 of the outer shell 1, thereby preventing wearing of the line due to any frictional engagement with the body of the holder. A cover 9 normally closes the upper ends of the outer shell 1 and the inner shell 3, as shown in Fig. 1, and the said cover 9 has its under surface provided with an angular groove 10 for the reception of the upper beaded end 4 of the outer shell 1. A retaining board, preferably of disk-shape, which is designated by the numeral 11, has a diameter exceeding the diameter of the outer shell 1, and rests on the upper surface of the ice, and is provided centrally with an opening through which extends the upper end of the upper shell 1. The outer shell 1 is provided, at diametrically opposite points, with L-shaped elements 12, which have their horizontal arms extending outwardly from the shell 1, and which are adapted to engage beneath horizontal arms 13 of substantially Z-shaped elements 14, which are mounted on the upper side of the board 11. The board 11 is adapted to be embedded in the ice, as shown in Fig. 1, and serves as means for normally holding the body of the line holder against movement in either direction in the opening in the ice, and by virtue of the connection between the elements 12 and 14, the board 11 can be made an integral part of the body of the line holder and so as to be associated with the line holder during the transportation of the latter. If desired, a glass cover 15 may be positioned over the upper end of the body, as shown in Fig. 1, and when so positioned has the lower end thereof resting on the upper side of the disk 11, and resiliently mounted clips 16 are carried by the upper side of the board 11 adjacent the periphery thereof and engage the cover 15, so as to prevent lateral movement of the cover on the board 11.

As shown in Fig. 1, the line 8 is first passed upwardly from the reel 7, and extended through an opening 17 formed in the cover 9, and then looped around the shank of a hook 18 carried by the periphery of a wheel 19. The wheel 19 is journaled in a suitable bracket 20 mounted on the upper side of the cover 9. The periphery of the wheel 19 is also provided, at a point diametrically opposite the hook 18, with a suitable signaling device 21, in the nature of a flag, to the staff of which is connected the upper end of a vertically disposed contractile spring 22, the lower end of the spring 22 being connected to the cover 9. In normal position, the flag 21 assumes a horizontal position, as shown in Fig. 3. However, when downward pull is exerted on the fishing line 8, due to a fish being caught on the lower end thereof, the line will exert a downward pull on the hook 18 and cause the wheel 19 to be rotated where it will effect raising of the flag 21 from the horizontal position to the vertical position, and also effect expansion of the spring 22. Upon raising of the flag to vertical position, the same will serve as a signal for signaling to a person in charge of the possibility of a fish being caught on the lower end of the line 8. The wheel 19 has one face thereof provided with a notch 23, which is adapted, when the flag is in raised position, to receive a finger 24 formed on the upper end of a vertically disposed spring 25, mounted on the cover 9, so as to prevent the rotation of the wheel 19 when the flag is in raised position. When the downward pull on the line 8 is relieved, and the finger 24 withdrawn from the notch 23, the spring 22 will return the flag 21 and wheel 19 to the position shown in Fig. 3. A bail 23 has its opposite ends pivotally connected to the inner side of the outer shell 1, adjacent the upper end thereof, the said bail providing means by which the shells 1 and 2 can be conveniently carried during transportation. It will, of course, be understood that during the carrying of the shells 1 and 2 by means of the bail 23, the cover 9 will have to be removed from operative position, and when the cover 9 is in operative position the bail 23 is moved inwardly within the upper end of the shell 1 to the position shown in Fig. 1 of the drawing.

When it is desired to remove the holder from the ice, a suitable heating medium, not shown, is inserted within the space between the shells 1 and 3 so as to effect heating of the walls of the shell 1 so as to melt the surrounding ice and permit the removal of the body of the holder from the opening in the ice. The cover 9 serves to retain the heat within the space between the shells 1 and 3, and also any heat that may be within the inner shell 3.

Various changes might be resorted to in the construction, form and arrangement of the several parts without departing from the spirit and scope of the invention as claimed.

Having thus described my invention what I claim as new, is:

1. A device of the class described comprising a body including inner and outer shells, the said inner shell being spaced from the outer shell throughout the major portion of its length, a line operatively supported by the inner shell, and the said inner shell having its lower end extending beyond the lower end of the outer shell, and a hollow extension receiving the lower end of the inner shell, for the purpose specified.

2. A fishing line holder including a hollow body open at its ends, and an inner shell secured to the body at its lower end and spaced from the body above said attached end, said shell providing a chamber within the body to receive hot water so as to free the body from ice.

In testimony whereof I affix my signature in presence of two witnesses.

JOHN F. TEELING.

Witnesses:
WILL W. SMITH,
WILLARD J. MINER.

Copies of this patent may be obtained for five cents each, by addressing the "Commissioner of Patents, Washington, D. C."